United States Patent Office 2,876,120
Patented Mar. 3, 1959

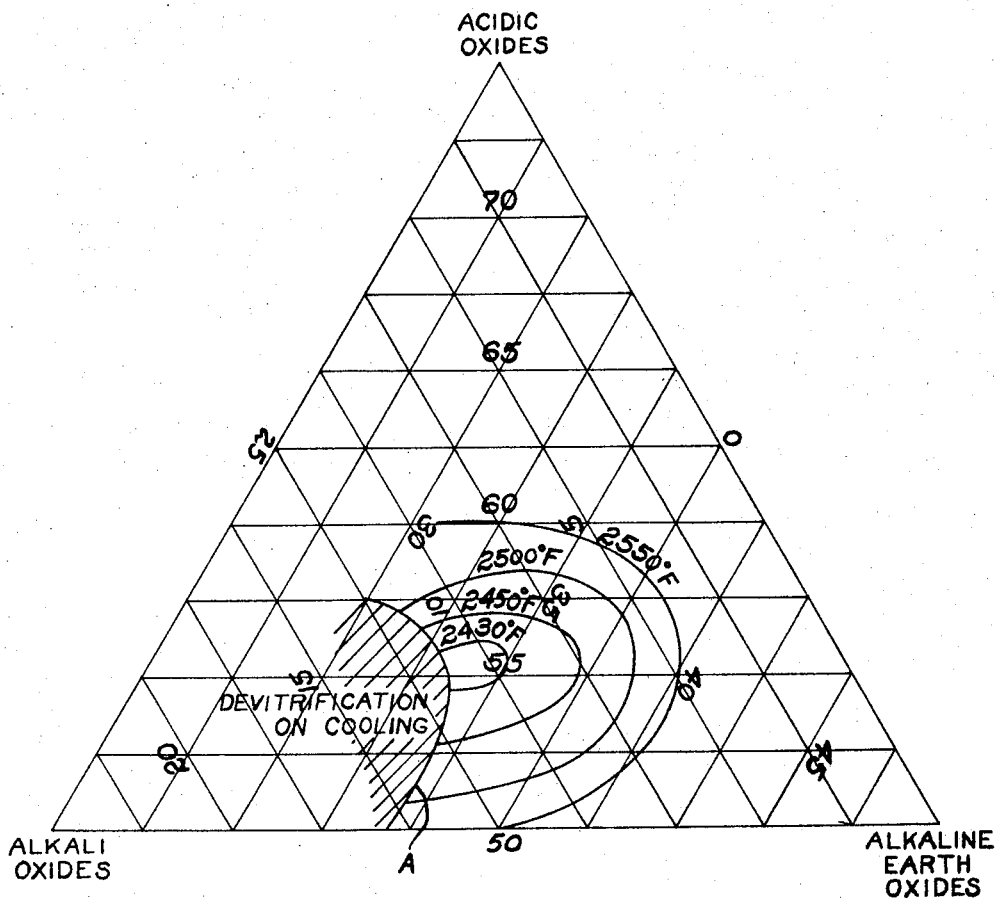

2,876,120
GLASS COMPOSITION

George R. Machlan, Newark, Ohio, assignor to Owens-Corning Fiberglas Corporation, a corporation of Delaware Application December 3, 1954, Serial No. 472,841

11 Claims. (Cl. 106—47)

This invention relates to glass and glass compositions and particularly to glass compositions exhibiting exceptionally high moduli of elasticity.

It is an object of this invention to provide a glass composition having greatly improved physical properties including a very high modulus and improved abrasion resistance without serious loss of other properties including heat resistance, dielectric strength and tensile strength.

It is a further object to provide a glass having a highly reactive surface that readily couples with protective compositions such as sizes, lubricants, after treatments and the like.

It is an object to provide a glass composition adaptable for being manufactured into fibers.

The glass compositions of this invention comprise (1) acidic oxides including $Al_2O_3$ along with one or more of the following: $SiO_2$, $B_2O_3$, $TiO_2$, $ZrO_2$, $SnO_2$, $PbO_2$, $P_2O_5$, $V_2O_5$; (2) alkaline earth oxides including CaO and one or more of the following: BaO, MgO; and (3) alkali oxides including one or more of the following: $Na_2O$, $K_2O$, $Li_2O$.

The drawing is a diagram showing a system of glasses illustrative of the invention, liquidus temperature curves being shown. The glass compositions defined have the mole ratio indicated, i. e., 4.8 $AlO_{1.5}$-$TiO_2$-$ZrO_2$; 16 CaO-3 MgO-BaO; $Na_2O$-$K_2O$.

The components of the glass composition are present in the following proportions expressed both in percent by weight and mole percent. It has been found advantageous in computing mole percentages or cation percentages to use the forms $AlO_{1.5}$, $NaO_{0.5}$, $KO_{0.5}$, $LiO_{0.5}$, and $BO_{1.5}$.

| Ingredient | Percent by Weight | Mole, Percent |
|---|---|---|
| (1) Acidic Oxides | 35-60 | 45-75 |
| (2) Alkaline Earth Oxides | 30-50 | 20-50 |
| (3) Alkali Oxides | 0-15 | 0-15 |

Ranges of proportions for these three components and limits related to specific ingredients within the components are as follows:

| Oxide | Percent by Weight | Mole, Percent |
|---|---|---|
| (1) Acidic Oxides | 35-60 | 45-75 |
| Aluminum | 25-60 | 30-75 |
| Silicon | Up to 12 | Up to 10 |
| Boron | Up to 10 | Up to 10 |
| Titanium | Up to 10 | Up to 10 |
| Zirconium | Up to 10 | Up to 10 |
| Tin | Up to 10 | Up to 10 |
| Lead | Up to 10 | Up to 10 |
| Phosphorus | Up to 10 | Up to 10 |
| Vanadium | Up to 10 | Up to 10 |

(Total of the acidic oxides other than aluminum oxide is to be from 0–12% computed either as weight or mole percent.)

All proportions expressed "by weight" are "percent by weight."

| Oxide | By Weight | Mole, Percent |
|---|---|---|
| (2) Alkaline Earth Oxides | 30-50 | 20-50 |
| Calcium (At least ½ of the alkaline earth oxides is CaO) | 15-50 | 10-50 |
| Barium | Up to 15 | Up to 10 |
| Magnesium | Up to 10 | Up to 10 |
| (3) Alkali Oxides | 0-15 | 0-15 |
| Sodium | Up to 10 | Up to 15 |
| Potassium | Up to 15 | Up to 15 |
| Lithium | Up to 10 | Up to 15 |

Preferred ranges of proportions for the ingredients are as follows:

| | By Weight | Mole, Percent |
|---|---|---|
| (1) Acidic Oxides: | | |
| Aluminum | 30-55 | 30-60 |
| Silicon | 0-12 | 0-10 |
| Boron | 0-5 | 0-10 |
| Titanium | 0-5 | 0-5 |
| Zirconium | 0-8 | 0-8 |

(Sum of acidic oxides other than $Al_2O_3$ to be not more than 20% of the total acidic oxides.)

| | By Weight | Mole, Percent |
|---|---|---|
| (2) Alkaline Earth Oxides: | | |
| Calcium | 19-45 | 15-40 |
| Barium | 5-15 | 1-10 |
| Magnesium | 2-10 | 2-10 |
| (3) Alkali Oxide: | | |
| Sodium | 0-8 | 0-12 |
| Potassium | 0-5 | 0-5 |
| Lithium | 0-10 | 0-15 |

Glass compositions have been prepared and bulk samples tested as indicated in the following examples. The glass compositions were melted at 2750° F. and annealed at 1300° F.

Example I

| Oxide | Percent by Weight | Mole, Percent |
|---|---|---|
| Aluminum | 52.8 | 57.3 |
| Titanium | 3.3 | 2.3 |
| Zirconium | 5.1 | 2.3 |
| Calcium | 20.1 | 19.8 |
| Magnesium | 4.1 | 5.6 |
| Barium | 9.2 | 3.3 |
| Sodium | 5.4 | 9.5 |
| | 100.0 | |

$E = 16.1 \times 10^6$ p. s. i.
Liquidus = 2580° F.

Example II

| Oxide | Percent by Weight | Mole, Percent |
|---|---|---|
| Aluminum | 50.7 | 52.2 |
| Silicon | 3.9 | 3.4 |
| Boron | 0.7 | 1.1 |
| Calcium | 29.5 | 27.5 |
| Magnesium | 4.0 | 5.2 |
| Barium | 5.0 | 1.7 |
| Sodium | 3.5 | 5.9 |
| Potassium | 2.7 | 3.0 |
| | 100.0 | |

$E = 16.0 \times 10^6$ p. s. i.
Liquidus = 2345° F.

Example III

| Oxide | Percent by Weight | Mole, Percent |
|---|---|---|
| Aluminum | 51.0 | 53.8 |
| Titanium | 1.7 | 1.1 |
| Zirconium | 2.6 | 1.1 |
| Calcium | 26.1 | 25.1 |
| Magnesium | 4.0 | 5.3 |
| Barium | 7.6 | 2.6 |
| Sodium | 2.5 | 4.4 |
| Potassium | 3.9 | 4.4 |
| Lithium | 0.6 | 2.2 |
| | 100.0 | |

$E = 16.5 \times 10^6$ p. s. i.
Liquidus = 2365° F.

Example IV

| Oxide | Percent by Weight | Mole, Percent |
|---|---|---|
| Aluminum | 44.8 | 46.5 |
| Silicon | 10.3 | 9.1 |
| Boron | 0.7 | 1.1 |
| Calcium | 29.2 | 27.5 |
| Magnesium | 3.9 | 5.2 |
| Barium | 5.0 | 1.7 |
| Sodium | 3.4 | 5.9 |
| Potassium | 2.7 | 3.0 |
| | 100.0 | |

$E = 16.0 \times 10^6$ p. s. i.
Liquidus = 2340° F.

Example V

| Oxide | Percen by Weight | Mole, Percent |
|---|---|---|
| Aluminum | 47.4 | 48.8 |
| Silicon | 6.5 | 5.7 |
| Boron | 1.5 | 2.3 |
| Calcium | 29.4 | 27.5 |
| Magnesium | 4.0 | 5.2 |
| Barium | 5.0 | 1.7 |
| Sodium | 3.5 | 5.9 |
| Potassium | 2.7 | 3.0 |
| | 100.0 | |

Liquidus = 2290° F.

As can be seen in the examples, the compositions comprise primarily alumina and calcia with minor proportions of other ingredients including oxides of barium, magnesium, sodium, potassium, lithium, silicon, boron, zirconium, titanium and the like. Other oxides which may be present in small proportions but are not essential to glass formation or the attainment of the desired physical properties are beryllium, bismuth, iron, cesium, zinc, cadmium and the like. All of these glass compositions in the annealed form provide a modulus of elasticity of $16 \times 10^6$ p. s. i. or greater. The glasses are fiberizable by conventional or special processes and in fiber form likewise have relatively high moduli of elasticity, i. e., $13.5 \times 10^6$ p. s. i. or greater. In addition to having low liquidus temperatures and very high moduli of elasticity, the glasses are abrasion resistant and are high strength glasses.

The abrasion resistance may result from the presence of metal soaps which form on the surface of the glass due to the adsorption of fatty acids such as stearic acid from the air. The adsorption of fatty acids forms thin coats of calcium and aluminum soaps of these acids which provide low friction effects.

Conventional fiber forming processes comprise flowing a stream of molten glass from a source thereof. This stream of molten glass is then attenuated into fibers by introducing the stream into a blast of gas or by mechanically pulling the stream with a suitable pulling device. As the glass is attenuated, solidification takes place and fine diameter fibers are produced. Steam blowers (Kleist et al. 2,287,006) or gas-air burners (Stalego 2,481,543) are used to provide a blast in some of the processes known in the art. Collet winders (Beach 2,391,870) and pulling wheels (Slayter et al. 2,729,027) are used as devices for mechanically attenuating fibers. Certain of the glass compositions are difficult to fiberize because of their rapid devitrification rate at or near the liquidus temperature and because of their viscosity-liquidus relationship. It has been found desirable to have a viscosity of from 50 to 100 poises or preferably higher at the operating temperature in order to facilitate formation of fibers.

In accordance with one of the special fiber-forming methods, the glass compositions are brought to a temperature sufficiently above the liquidus to insure little likelihood of devitrification during fiber-forming and then the removal of heat from the glass during fiber formation is controlled by the use of cooling devices disposed about the orifices through which the molten glass emits in the form of a stream. For instance, in conjunction with molten glass feeders having a plurality of orifices disposed in an equal number of tips, fin or tube cooling devices have been used, see Russell Re. 24,060. By such means heat is controllably removed from the stream or streams of molten glass to allow very "watery" glasses to be handled and prevent devitrification during the fiber-forming operation. The removal of heat by cooling devices is in addition to the rapid cooling inherently present in fiber forming processes because of the rapid increase in the surface area to total volume relationship which takes place in the glass as it is fiberized.

Blowing processes and/or centrifugal processes (Stalego et al. 2,609,566) are especially adapted for forming fibers of glass compositions which are fiberized only with great difficulty.

In one suitable forming method, fibers are blown onto a drum and a veil or web of fibers is drafted from the drum by passing the veil through an air turbine or other suitable device, see Tucker et al. 2,264,345. The resultant sliver is pulled through a tank containing resin to protect the glass surface.

Glass compositions lying within the curves representing liquidus temperatures of from 2550° F. and less in Figure 1 are representative of the improved compositions of this invention. It is desirable to use a glass composition having a low liquidus if the glass is to be fiberized; therefore, compositions lying within the area bounded by line A and the curve representing 2430° F. are preferred. In order to achieve high strengths, glass compositions lying within that area designated "Devitrification on Cooling" are avoided.

The compositions in the system shown in the drawing are silica-free. Silica, if added, is added in minor proportions, see Examples II, IV, and V. Various other oxides may be used in the compositions in minor proportions.

Modifications and variations within the scope of the appended claims are included.

I claim:

1. Glass composition consisting essentially of from 45 to 75 mole percent of acidic oxides present as alumina, titania and zirconia in a mole ratio of 4.8 $AlO_{1.5}$–1 $TiO_2$–1$ZrO_2$, 20 to 50 mole percent of alkaline earth oxides present as calcia, magnesia and baria in a mole ratio of 16 CaO–3 MgO–1 BaO, and 0 to 15 mole percent of alkali oxides present as soda and potassia in a mole ratio of 2 $Na_2O$–1 $K_2O$.

2. A glass composition consisting essentially of from 35 to 60 parts of acidic oxides including aluminum oxide and at least one material from the group consisting of oxides of aluminum, silicon, boron, titanium, zirconium, tin, lead, phosphorus and vanadium, from 30 to 50 parts of alakaline earth oxides from the group consisting of oxides of calcium, barium, and magnesium, and from 0 to 15 parts of alakil oxides from the group consisting of oxides of sodium, potassium, and lithium, all parts being by weight.

3. Glass composition consisting essentially by weight, 44.8 percent aluminum oxide, 10.3 percent silicon oxide, 0.7 percent boron oxide, 29.2 percent calcium oxide, 3.9 percent magnesium oxide, 5.0 percent barium oxide, 3.4 percent sodium oxide, and 2.7 percent potassium oxide.

4. Glass composition consisting essentially by weight, 50.7 percent aluminum oxide, 3.9 percent silicon oxide, 0.7 percent boron oxide, 29.5 percent calcium oxide, 4.0 percent magnesium oxide, 5.0 percent barium oxide, 3.5 percent sodium oxide, and 2.7 percent potassium oxide.

5. Glass composition consisting essentially by weight, 51.0 percent aluminum oxide, 1.7 percent titanium oxide, 2.6 percent zirconium oxide, 26.1 percent calcium oxide, 4.0 percent magnesium oxide, 7.6 percent barium oxide, 2.5 percent sodium oxide, 3.9 percent potassium oxide, and 0.6 percent lithium oxide.

6. Glass composition consisting essentially by weight, 44.8 percent aluminum oxide, 10.3 percent silicon oxide, 0.7 percent boron oxide, 29.2 percent calcium oxide, 3.9 percent magnesium oxide, 5.0 percent barium oxide, 3.4 percent sodium oxide, and 2.7 percent potassium oxide.

7. Glass composition consisting essentially by weight, 47.4 percent aluminum oxide, 6.5 percent silicon oxide, 1.5 percent boron oxide, 29.4 percent calcium oxide, 4.0 percent magnesium oxide, 5.0 percent barium oxide, 3.5 percent sodium oxide, and 2.7 percent potassium oxide.

8. Glass compositions of claim 1 within that area of the phase diagram of the acidic oxides $$(4.8\ AlO_{1.5}:TiO_2:ZrO_2)$$

alkaline earth oxides (16 CaO:3 MgO:BaO), alkali oxides (2 $Na_2O:K_2O$) system defined by the 2430° F. liquidus curve and line A, the Devitrification on Cooling Line.

9. A glass composition suitable for forming fibers consisting essentially of from 30 to 60 percent alumina, from 15 to 40 percent calcia, from 1 to 10 percent baria, from 2 to 10 percent magnesia and up to 15 percent alkali oxides, all proportions being expressed in mole percent.

10. Glass composition consisting essentially of from 35 to 60 parts by weight acidic oxides, aluminum oxide preferably being present in proportions of from 30 to 55 parts by weight, silicon oxide being present in proportions of from 0 to 12 parts by weight, boron oxide being present in proportions of from 0 to 5 parts by weight, titanium oxide being present in proportions of from 0 to 5 parts by weight, zirconium oxide being present in proportions of from 0 to 8 parts by weight, the total of the acidic oxides other than aluminum oxide being less than 20 percent of the total acidic oxides, from 30 to 50 parts by weight of alkaline earth oxides, with calcium oxide present in proportions of from 19 to 45 parts by weight, barium oxide present in proportions of from 5 to 15 parts by weight, and magnesium oxide present in proportions of from 2 to 10 parts by weight, and up to 15 parts by weight of alkali oxides from the group consisting of sodium oxide, potassium oxide and lithium oxide.

11. The glass composition of claim 2 wherein the acidic oxides include from 30 to 55 parts by weight alumina.

References Cited in the file of this patent

UNITED STATES PATENTS

| | | |
|---|---|---|
| 1,736,642 | Beaudry | Nov. 19, 1929 |
| 2,083,132 | Williams | June 8, 1937 |
| 2,252,495 | Dusing | Aug. 12, 1941 |
| 2,650,173 | Goulding | Aug. 25, 1953 |
| 2,681,289 | Moore | June 15, 1954 |
| 2,685,527 | Labino | Aug. 3, 1954 |

FOREIGN PATENTS

| | | |
|---|---|---|
| 406,142 | Great Britain | 1934 |
| 708,698 | Great Britain | 1954 |

OTHER REFERENCES

R. K. Day: Glass Research Methods (1953), p. 192.

E. M. Levin et al.: Phase Diagrams for Ceramists (1956), pages 75 and 90 (Figs. 160 and 205).

J. H. Koenig et al.: Literature Abstracts of Ceramic Glazes (1951), p. 264.